No. 712,584. Patented Nov. 4, 1902.
J. S. PECK.
WINDING FOR ELECTRICAL TRANSFORMERS.
(Application filed Mar. 21, 1902.)

(No Model.)

WITNESSES:
C. L. Belcher
Birney Hines

INVENTOR
John S. Peck
BY
Kesley Gleason
ATTORNEY

UNITED STATES PATENT OFFICE.

JOHN S. PECK, OF PITTSBURG, PENNSYLVANIA, ASSIGNOR TO WESTINGHOUSE ELECTRIC & MANUFACTURING COMPANY, A CORPORATION OF PENNSYLVANIA.

WINDING FOR ELECTRICAL TRANSFORMERS.

SPECIFICATION forming part of Letters Patent No. 712,584, dated November 4, 1902.

Application filed March 21, 1902. Serial No. 99,247. (No model.)

*To all whom it may concern:*

Be it known that I, JOHN S. PECK, a citizen of the United States, residing in Pittsburg, in the county of Allegheny and State of Pennsylvania, have invented a new and useful Improvement in Windings for Electrical Transformers, of which the following is a specification.

My invention relates to transformers employed for transforming electrical energy of one potential and quantity to energy of a different potential and quantity, and has for its object to provide such arrangements and circuit connections for the coils which are comprised in either a primary or a secondary parallel-circuit winding, or in both, as will insure uniform induction for the several circuits, so that the electromotive force generated in each coil of the winding shall be equal to that generated in every other coil, and consequently so that the current will be divided proportionately between the coils and the generation of heat be thus reduced to a minimum.

Figure 1:
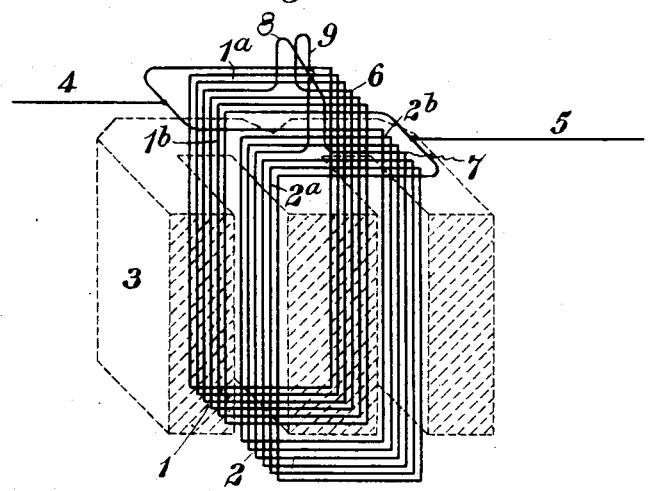
Figure 2:
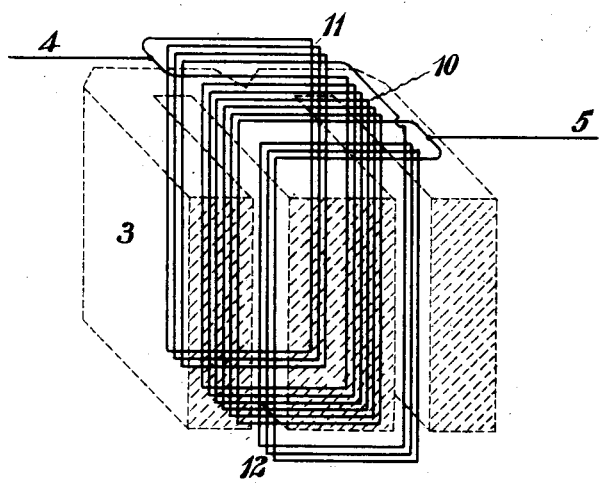

One form of my invention is illustrated in Figure 1 of the accompanying drawings, which is a diagrammatic perspective view of one of the windings of a transformer, a portion of the core of the transformer being shown in broken lines. Fig. 2 illustrates similarly a modified arrangement of winding for securing substantially the same result as that secured by the winding shown in Fig. 1.

As illustrated in Fig. 1, the winding comprises two coils 1 and 2, each of which consists of six turns, and the two coils are connected in parallel to the external leads 4 and 5. I have shown a transformer of the so-called "shell" type; but it is to be understood that the invention is not limited to any specific type or kind of transformer.

In order that the winding may be electrically balanced and the heating be thus reduced to a minimum, I cut the middle turn 6 of the coil 1 and the corresponding turn 7 of the coil 2, so as to form two sections $1^a$ and $1^b$ of the former and two corresponding sections $2^a$ and $2^b$ of the latter and then join the ends of sections $1^a$ and $2^a$ by means of a cross-connector 8 and the ends of sections $1^b$ and $2^b$ by means of a cross-connector 9. It follows that the current coming in, for example, through the lead 4 traverses the section $2^b$ of the coil 2, then crosses over by the conductor 9, traverses the section $1^b$ of the coil 1, and then passes out through the lead 5. The corresponding parallel path for the current is first through the section $1^a$ of the coil 1, then through the conductor 8 and the section $2^a$ of the coil 2, and thence out through the lead 5. It will be understood that this construction and arrangement of coils is adapted for both primary and secondary windings and also that the number of turns in each coil may be greater or less than what is here shown. It will be also understood that the transformer-winding may comprise three or more coils connected in parallel and that such coils may be divided and the sections so cross-connected that the three parallel circuits may have the same inductive relation to the other winding of the transformer.

In the case of three coils connected in parallel each coil will be subdivided into thirds by cutting it at two points, and the three sections thus formed will be cross-connected in substantially the manner shown, so that each of the three parallel circuits shall comprise a section from each coil, uniform induction being thus insured.

I have not deemed it necessary to specifically illustrate a winding comprising more than two coils, since any number of coils and any number of turns per coil which may be desired may be readily arranged and connected in accordance with my invention by those skilled in the art in view of the disclosure already made.

In Fig. 2 I have shown an arrangement of winding for securing substantially the result hereinbefore set forth which is applicable to only a two-coil winding. In this arrangement an undivided coil 10 occupies a central position in the winding, and the other coil is divided into two equal parts, the part 11 being located at one side of the coil 10 and the part 12 being correspondingly located at the other side. With this arrangement the two parts 11 and 12 are connected in series with each other and in parallel with the coil 10, the circuit connections being the same, therefore, as if both coils were undivided and were located side by side. With this arrangement, however, the mean position of the two coils is the same, so that their average distance from the other winding of the transformer is the same, and consequently no local currents will flow between them to effect the production of heat without useful result.

As has been already indicated, coils of different form and arrangement from what I have specifically shown may be employed, and it will be further understood that the cross-connected coil-sections may be originally wound as separate coils instead of being formed by subdivision, as here shown, if desired.

I claim as my invention—

1. A parallel-circuit winding for electrical transformers comprising a plurality of coils severally subdivided and mutually cross-connected so as to insure the same inductive relation for all of the parallel circuits.

2. A parallel-circuit winding for electrical transformers comprising a plurality of coils which are severally interrupted at intermediate points and are mutually cross-connected to provide an inductive balance for the parallel circuits.

3. A parallel-circuit winding for electrical transformers comprising two coils, the first half of each of which is cross-connected in series with the second half of the other to provide an inductive balance between the parallel circuits.

4. A parallel-circuit winding for electrical transformers comprising a plurality of coils each of which is divided into as many sections as there are coils in the set, said sections being so cross-connected that each of the parallel circuits comprises a section of each of the coils.

5. A parallel-circuit winding for electrical transformers comprising a plurality of coils severally divided into equal sections which are cross-connected so that each of the parallel paths shall comprise substantially equal lengths of the several coils.

6. A parallel-circuit winding for electrical transformers comprising a plurality of coils which are subjected to unequal induction, said coils being divided into as many equal sections as there are coils and said sections being so cross-connected that the induction is uniform for the several parallel circuits.

7. A parallel-circuit winding for electrical transformers, comprising a plurality of coils at least one of which is divided and the divisions so-connected in circuit that the parallel circuits shall be subjected to substantially uniform induction.

In testimony whereof I have hereunto subscribed my name this 18th day of March, 1902.

JOHN S. PECK.

Witnesses:
JAMES B. YOUNG,
BIRNEY HINES.